Jan. 10, 1939. E. DOBROWSKY 2,143,143
ADVERTISING DEVICE
Filed March 8, 1938 3 Sheets-Sheet 2
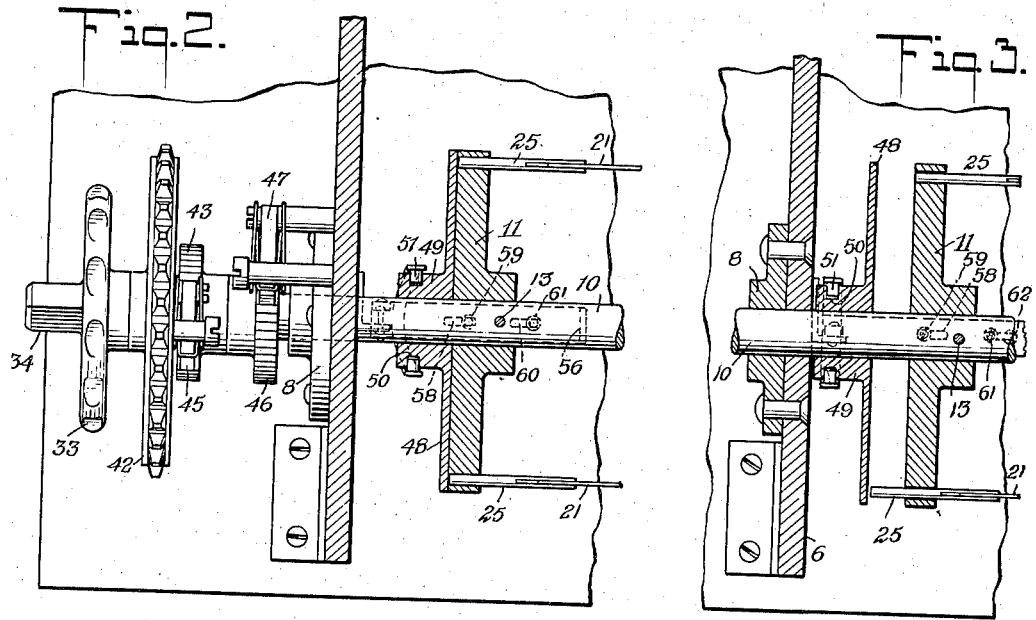
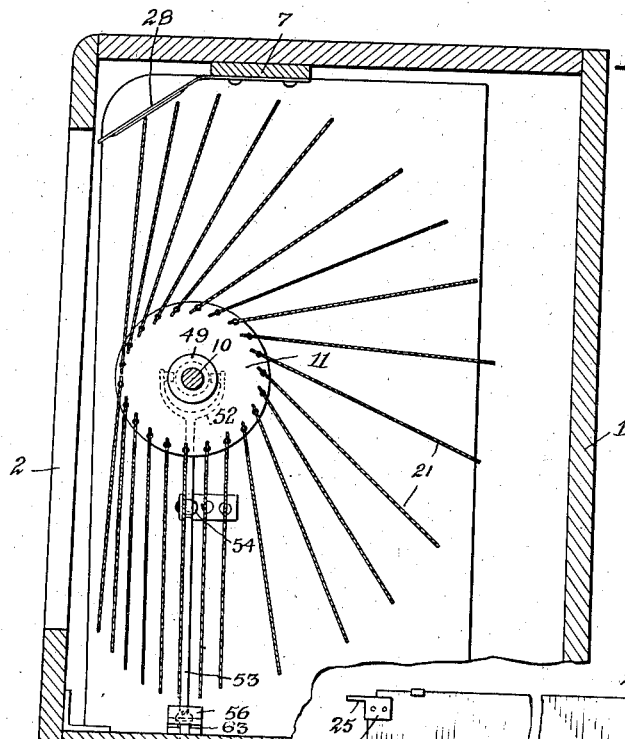
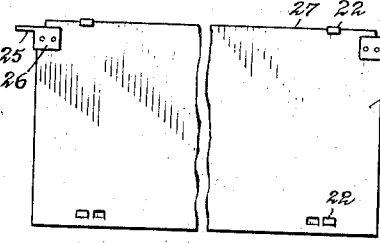
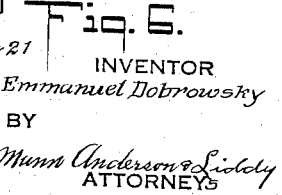
INVENTOR
Emmanuel Dobrowsky
BY
Munn Anderson & Liddy
ATTORNEYS Jan. 10, 1939.  E. DOBROWSKY  2,143,143
ADVERTISING DEVICE
Filed March 8, 1938  3 Sheets-Sheet 3

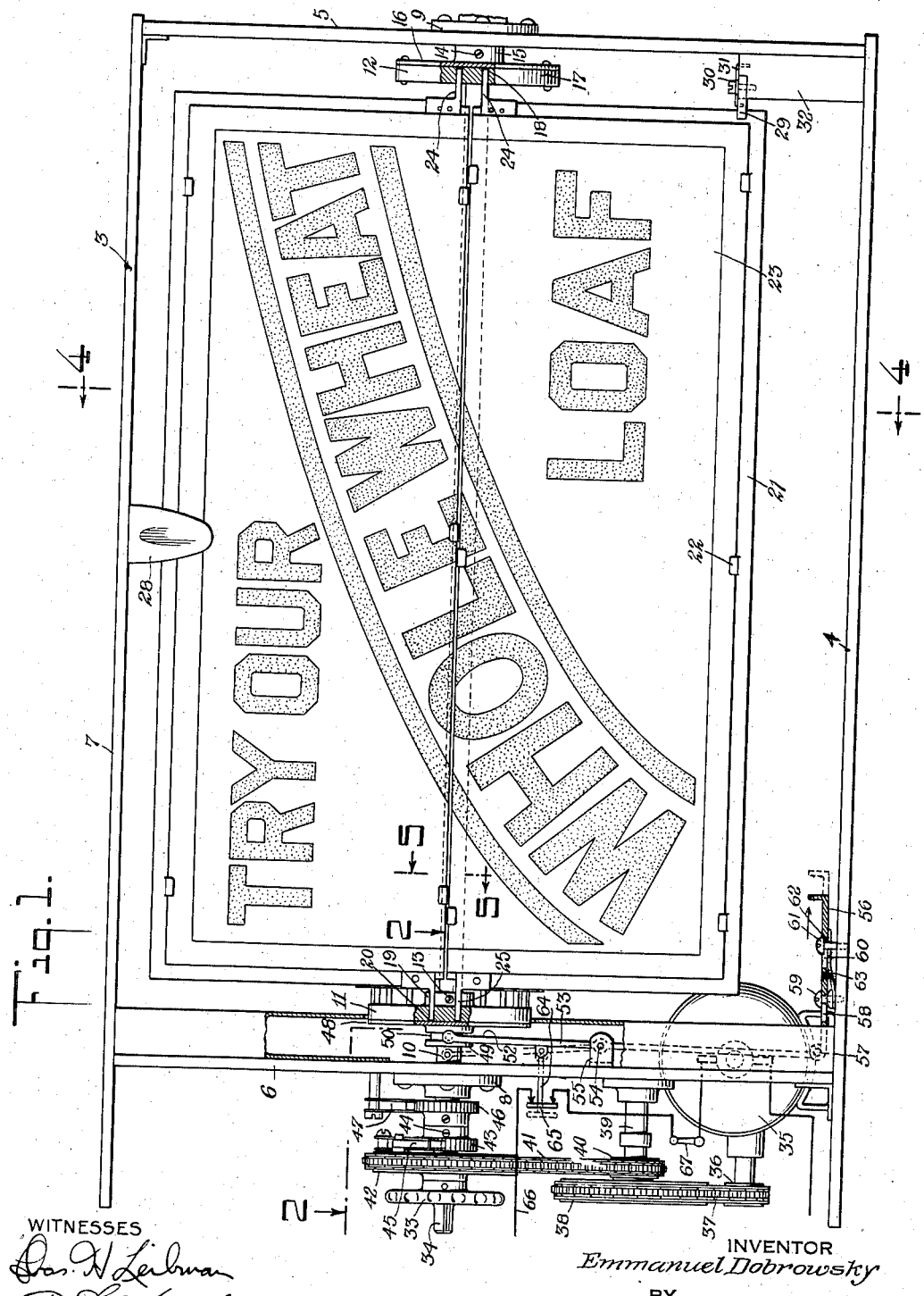

WITNESSES

INVENTOR
Emmanuel Dobrowsky
BY
ATTORNEYS

Patented Jan. 10, 1939

2,143,143

UNITED STATES PATENT OFFICE 2,143,143

ADVERTISING DEVICE

Emmanuel Dobrowsky, New York, N. Y., assignor to Motor Car Advertising Device Co., Inc., New York, N. Y., a corporation of New York Application March 8, 1938, Serial No. 194,576

6 Claims. (Cl. 40—35)

This invention relates to an improved advertising device, and has for an object to provide a construction for displaying advertising cards.

Another object of the invention is to provide an advertising device arranged to successively bring into view advertising cards with the parts arranged so that two aligned cards will present a single advertising subject matter.

An additional object of the invention is to provide a display device using advertising cards and to present a construction whereby the holding frames for the cards may be readily removed and replaced while the machine is stationary or while the machine is functioning.

Another object of the invention is to provide a display device wherein a plurality of display cards are mounted on a rotating structure positioned to cause two of the cards to be aligned on each display thereof, the structure including means to prevent the cards swinging or moving until the desired time.

In the accompanying drawings—

Fig. 1 is an elevation of an advertising device disclosing an embodiment of the invention, parts being broken away in order to show certain detail structures;

Fig. 2 is an enlarged fragmentary sectional view through Fig. 1 approximately on the line 2—2;

Fig. 3 is a view similar to the right-hand part of Fig. 2 but showing the parts in an adjusted position;

Fig. 4 is a transverse sectional view through Fig. 1 approximately on the line 4—4;

Fig. 5 is an enlarged fragmentary section view through Fig. 1 approximately on the line 5—5;

Fig. 6 is a detail elevation of one of the leaves shown in Fig. 1;

Figure 7:
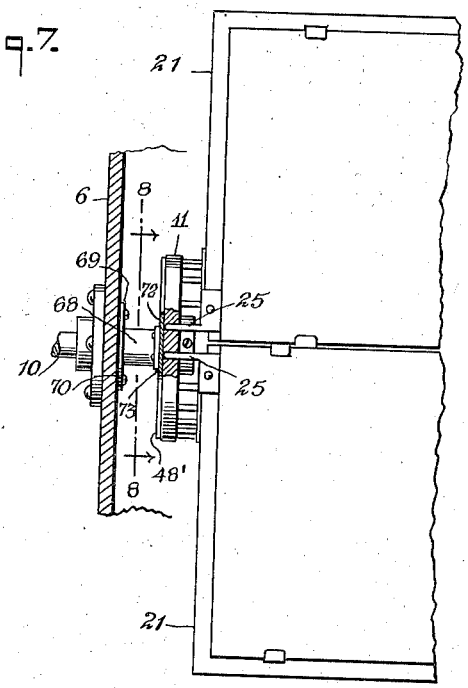
Fig. 7 is a fragmentary view shown at the left-hand end of Fig. 1 illustrating a modified form of construction.
Figure 8:
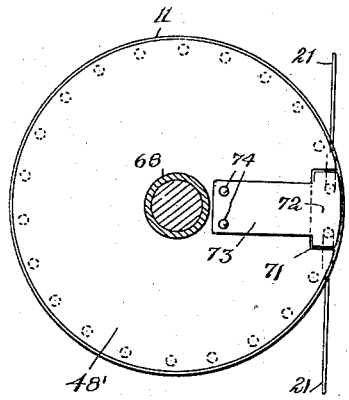
Fig. 8 is a sectional view through Fig. 7 on the line 8—8.

Referring to the accompanying drawings by numerals, 1 indicates a casing of any desired kind provided with a large window opening 2 as illustrated in Fig. 4. Within the casing 1 is arranged the various moving parts of the device and in addition a frame 3 which has a base plate 4, uprights 5 and 6, and a top plate 7. The uprights 5 and 6 are provided with suitable bearings 8 and 9 which are preferably ball bearings and which support a rotatable shaft 10. A hub structure is connected with shaft 10, said hub structure consisting of a primary hub member 11 and an auxiliary hub member 12. These members are secured to the shaft 10 in any suitable way, as for instance by the respective set screws 13 and 14. The set screw 14 extends through the hub portion 15 of the plate 16 riveted or otherwise rigidly secured to the disk 17. These members are all made from metal and before the plate 16 is mounted in position a number of apertures 18 are drilled therein, said apertures being arranged in a circle and spaced apart. When the parts are connected together and mounted as shown in Fig. 1, they are, in effect, integral with or rigidly secured to the shaft 10.

The primary hub member 11 is formed with an extension 19 which carries the set screw 13 whereby the member 11 is rigidly secured to shaft 10. This member is provided with a number of apertures 20 which extend entirely therethrough.

Associated with the hub structure are a number of leaves 21. These leaves may be made in various ways, as for instance made from sheet metal as shown in Fig. 6, with certain parts 22 pressed therefrom so as to provide retaining ears for the reception of cards 23. Journal pins 24 and 25 are provided for each card. Each of these journal pins has a straddling enlargement 26 which straddles the respective end portions of the leaves 21 and are riveted thereto by suitable rivets. As shown particularly in Figs. 1 and 6 the pivotal pins 24 and 25 are set back or inwardly from the inner longitudinal edge 27 of the leaf. By this arrangement the various leaves may properly swing as shown in Fig. 4 and yet the cards will be brought very close together. This is of advantage in that many of the advertising elements on the respective cards 23 cross the division line from an upper card to a lower card as shown in Fig. 1.

A resilient holding finger 28 is riveted or otherwise rigidly secured to the plate 7 and functions as shown in Fig. 4 to hold back the upper leaves until they pass this finger. Immediately upon the leaves passing this finger they swing downwardly to the lower position as shown in Fig. 4 so that the front face of the upper card and the rear face of the lower card will be seen, as shown in Fig. 1, but when the card swings to its lower position it strikes a spring-held stop or catch 29. This stop may be formed of metal or other material and suitably mounted on a pin 30 which also holds a spring 31 in place. One end of the spring 31 may be embedded in a block 32 and the other end in the catch 29 so as to resiliently hold the catch in the position shown in Fig. 1. When the leaves 21 swing downwardly there is sufficient power to permit the same to snap past the catch 29, but if the lower leaf attempts to swing back the spring 31 is sufficiently strong to prevent any backward swinging movement and thus the upper and lower leaves are held as shown in Fig. 1 until the upper leaf is released by a proper turning movement of the shaft 10 and the hub structure.

The shaft 10 may be rotated by power or by hand. This shaft has a hand wheel 33 rigidly secured thereto, which may be actuated at any time to turn the hub structure slowly or quickly. This is of advantage when it is desired to replace one or more cards 23. When this is the case, the hand wheel is rotated rather rapidly until the card to be removed appears as the upper card. This card is removed, a new one substituted, and the hand wheel 33 further rotated if the second card is to be removed. This action may take place either while the power structure hereinafter fully described is stationary or functioning.

The power structure is designed to rather slowly move the hub structure and the workmen need not wait until the described card appears but may quickly bring the desired card to view by a manual actuation of the wheel 33. The shaft 10 is also squared at 34 so that a key may be inserted into the housing 1 and the shaft properly actuated. The power structure includes a prime mover 35 which may be an electric motor. The electric motor rotates a sprocket wheel 36 which causes a chain 37 to function, and this chain 37 is fitted over a large sprocket wheel 38. The sprocket wheel 38 is rotatably mounted on a supporting shaft 39 carried by the upright 6, while a small sprocket 40 is rigidly secured to sprocket wheel 38 and is therefore rotated thereby. The chain 41 is fitted on the sprocket 40 and also on a large sprocket wheel 42, which large sprocket wheel is loosely mounted on shaft 10. A ratchet wheel 43 is rigidly secured to shaft 10 by set screw 44 or other suitable means. The sprocket wheel 42 carries a spring-pressed pawl 45 so that when sprocket wheel 42 is rotated in one direction the shaft 10 will be likewise rotated. A second ratchet wheel 46 is also rigidly secured to shaft 10 by a set screw or other suitable means, and a spring-pressed pawl 47 coacts with the ratchet wheel 46 so as to prevent any reverse rotation of shaft 10. When the hand wheel 33 is rotated the ratchet wheels 43 and 46 will also be rotated but sprocket wheel 42 will not be rotated. By reason of this construction the hand wheel 33 may be used either while the motor 35 is stationary or while it is functioning.

As shown particularly in Fig. 1, the various pins 24 and 25 are approximately twice the length of the hub members 11 and 12 though they could be slightly more than twice the length. This is to allow the leaves 21 to be removed and applied whenever desired. When the parts are arranged as shown in Fig. 1 the leaves are locked in position, but if it should be desired to remove one of the leaves the retaining plate 48 is moved to the left as shown in Fig. 3. This will permit an operator to grasp one of the leaves, as for instance the lowermost leaf, and slide the same to the position shown in Fig. 1. This will cause the pin 24 at the opposite end to leave the ring 17. After this has been done the leaf is swung slightly away from ring 17 and then the sliding action is reversed so that the pin 25 may be slid out of the hub member 11. This may be done while the motor 35 is functioning or while it is stationary. The leaf may be left out or a new leaf may be inserted and after the new leaf has been inserted the plate 48 is returned to the position shown in Figs. 1 and 2. This locks or holds the leaves against accidental removal.

The plate 48 is provided with a hub 49 as shown in Fig. 3. This hub is provided with an annular groove 50 into which the respective pins 51 extend. These pins are carried by a suitable yoke 52 that is connected to a lever 53. The lever 53 is pivotally mounted at 54 on a bracket 55 secured to the upright 6. A sliding locking plate 56 is hingedly connected at 57 to the lower end of lever 53. The plate 56 is manually actuated and is provided with a slot 58 for accommodating a retaining pin 59. A second slot 60 accommodates a pin 61, which pin has a head adapted to fit into a socket or depression 62 (Fig. 3). A spring 63 acts to swing the outer end of plate 56 upwardly as shown in Fig. 1, so that the head of the screw 61 will automatically snap into the depression 62.

When in the position shown in Fig. 1, plate 48 is locked against movement but if it should be desired to slide the same to the position shown in Fig. 3 the outer end of plate 56, as shown in Fig. 1, is depressed and pulled to the right. This will swing the lever 53 until the plate 48 is in the position shown in Fig. 3. This will allow leaves to be removed and added.

In order to prevent a workman from inadvertently leaving the parts in the position shown in Fig. 3 after changing a leaf, a special switch arrangement has been provided as shown particularly in Fig. 1. When the member 56 is pulled to the dotted position as shown in Fig. 1, lever 53 will be swung to the left at the upper end so as to bring the plate 48 to the position shown in Fig. 3. This will push the rod 64 so that it will open the switch 65. It will be observed that switch 65 is inserted in the wiring 66 of motor 35. The hand switch 67 is also inserted in the same wiring so that the motor may be turned on and off manually whenever desired. However, when the parts are in the position shown in Fig. 1 the device is operated, but if a workman should open switch 67 to stop the machine and then pull motor 56 outwardly to the dotted position shown in Fig. 1 in order to move plate 48 away from the hub member 11, switch 65 would also be opened. After the leaves have been added or removed the workman can close switch 67 but the device will not start until plate 56 has been slid back to its normal position, whereupon switch 65 will be closed and plate 48 will be moved against the hub member 11. Normally when the machine is operating and it is desired to remove a leaf, plate 56 is moved outwardly without touching the hand switch 67. This will stop the machine but the workman may operate the hand wheel 33 for rotating the parts in order to remove the desired leaves. After the leaves have been removed or added, the machine cannot be started until plate 56 is pushed back to the full line position shown in Fig. 1.

Figure 9:
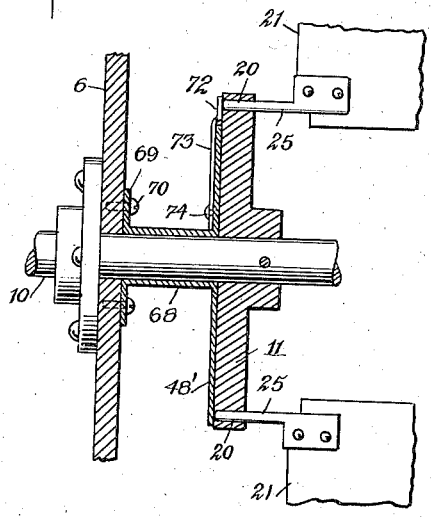
Fig. 9 is a sectional view similar to Fig. 2 but showing the modified form illustrated in Fig. 7.
Figure 10:
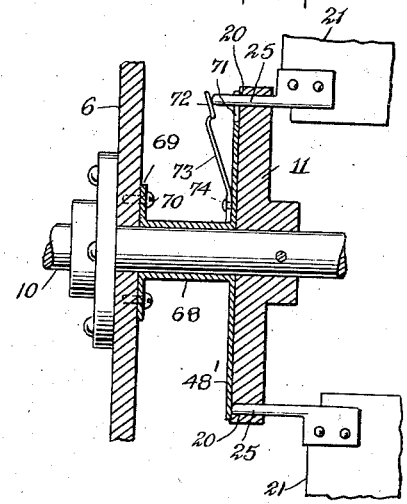
Fig. 10 is a view similar to Fig. 9 but showing one of the leaves being removed.

In Figs. 7 to 10 inclusive a slightly modified form of construction is shown wherein the sliding plate 48 is eliminated and the various parts associated therewith. In this form of the invention instead of moving the plate when removing a leaf, a spring is bowed as shown in Fig. 10. It will therefore be seen that a plate 48' is held against the hub member 11 but does not rotate therewith. This plate is provided with a tubular extension 68 which is formed with an annular flange 69 secured by suitable means, as for instance screws 70, to the upright 6. The plate 48' is cut away near the periphery for forming a notch 71 and the enlarged offset end 72 of spring 73 fits into this notch as shown in Fig. 9. Suitable rivets or other securing means 74 rigidly secure one end of the spring 73 to the plate 48'. This plate is positioned so that the notch 71 will be facing any one looking at the sign. It will therefore be seen that the two leaves facing an observer, as shown in Fig. 1, will have their pivotal members opposite the notch 71. By moving the upper leaf to the left, as shown in Fig. 10, spring 73 will be bowed and the leaf disengaged from the hub member 12. A reverse movement will remove the pivotal point from the hub 11 so that a new leaf may be substituted if desired. The spring 73 is sufficiently strong to prevent this movement unless performed by a workman.

I claim:

1. An advertising device including a rotating hub having an actuating shaft, a plurality of leaves carried by said shaft bearing interchangeable advertising matter adapted to be successively displayed upon the rotation of said hub, a manually actuated member rigidly secured to said shaft for manually actuating said shaft, power actuated means freely rotatable on said shaft, and means for connecting to said shaft said power actuated means when rotating in one direction, said manually actuated member and said power actuated means being operable at different times and also at the same time.

2. An advertising device including a rotatable hub, a plurality of leaves independently pivotally mounted on said hub in spaced relation, power means for intermittently rotating said hub, hand actuated means for rotating said hub independently of said power means while the power means is functioning and also while the power means is not functioning, and spring means adjacent the top and bottom of the device for holding the exposed leaves against movement while said hub is stationary.

3. An advertising device including a rotatable shaft, means for rotating said shaft, a primary hub rigidly secured to said shaft near one end thereof, a secondary hub rigidly secured to said shaft near the opposite end, each of said hubs being formed with spaced apertures arranged in a circle, means carried by said secondary hub for permanently closing one end of the apertures therein, a plate slidingly mounted on said shaft near the primary hub, hand actuated means for moving said plate to a position against said primary hub and away from the same, said hand actuated means including a lever and means for locking the lever against accidental functioning, a plurality of leaves having changeable advertising matter thereon, each of said leaves having a pivotal pin at each end, said pins being at least twice the length of the apertures in said hub whereby when said sliding plate is moved away from said primary hub said leaves may be slid axially in respect to said pins until the pins in the secondary hub has moved out of the apertures therein, swung to one side, and then slid in the opposite direction until disengaged from said primary hub, said sliding plate preventing sliding motion of said leaves when the plate is contacting said primary hub.

4. An advertising device including a hub structure having a plurality of leaves bearing changeable advertising matter thereon, each of said leaves having a sliding pivotal member for each of said leaves extending into said hub structure, a plate normally resting against said hub structure for preventing sliding movement of said pivotal members, a pivotally mounted lever for moving said plate toward and from said hub structure, a hand-actuated sliding member pivotally connected with one end of said lever, and means for locking said sliding member against sliding movement when said plate is bearing against said hub structure.

5. An advertising device including a rotatable shaft, a hub structure provided with openings therein, a plurality of leaves having pivotal pins fitting into said openings, said pins being approximately twice as long as the length of the openings whereby the leaves may be slid in one direction so as to have the pivotal pins removed, a sliding plate normally preventing the sliding movement of said leaves, and means including a lever for sliding said plate to a position to permit said leaves to be slid into and out of said hub structure, means for rotating said hub structure including an electric motor, and a switch connected with the means for moving said plate, said connection being so positioned as to cause said means to open the switch when the plate is moved in one direction and to close the switch when the plate is moved in the opposite direction.

6. An advertising device including a hub structure having a plurality of leaves bearing changeable advertising matter thereon, each of said leaves having a sliding pivotal member extending into said hub structure, a plate resting against the hub structure for preventing sliding movement of said pivotal member, said plate having a notch therein near the periphery, a flat spring secured to said plate with a portion normally filling said notch, and means for holding said plate stationary while the hub structure rotates.

EMMANUEL DOBROWSKY.